May 7, 1929.  T. B. FORSYTH  1,711,883
ADJUSTABLE TROLLEY FROG OR SWITCH
Filed July 20, 1927   2 Sheets-Sheet 1
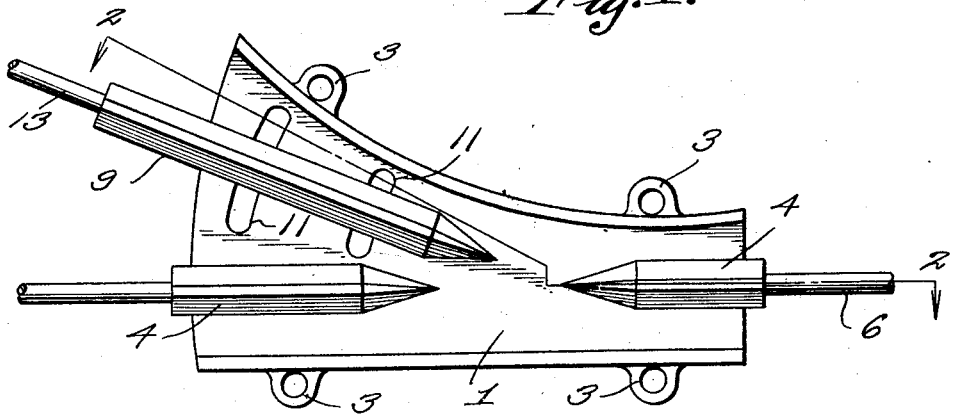
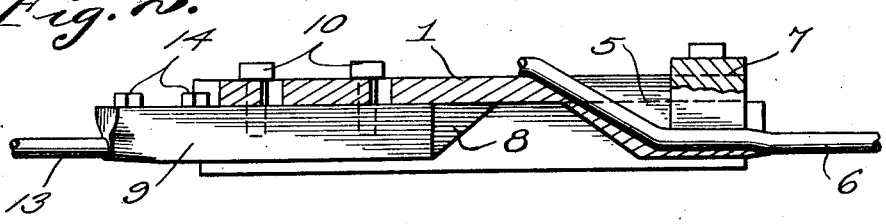
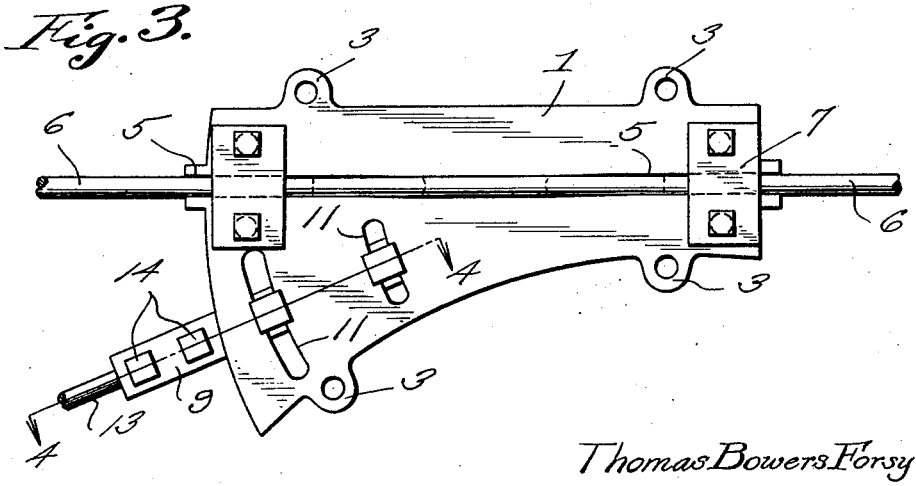
Thomas Bowers Forsyth
INVENTOR
BY Victor J. Evans
ATTORNEY
WITNESS:

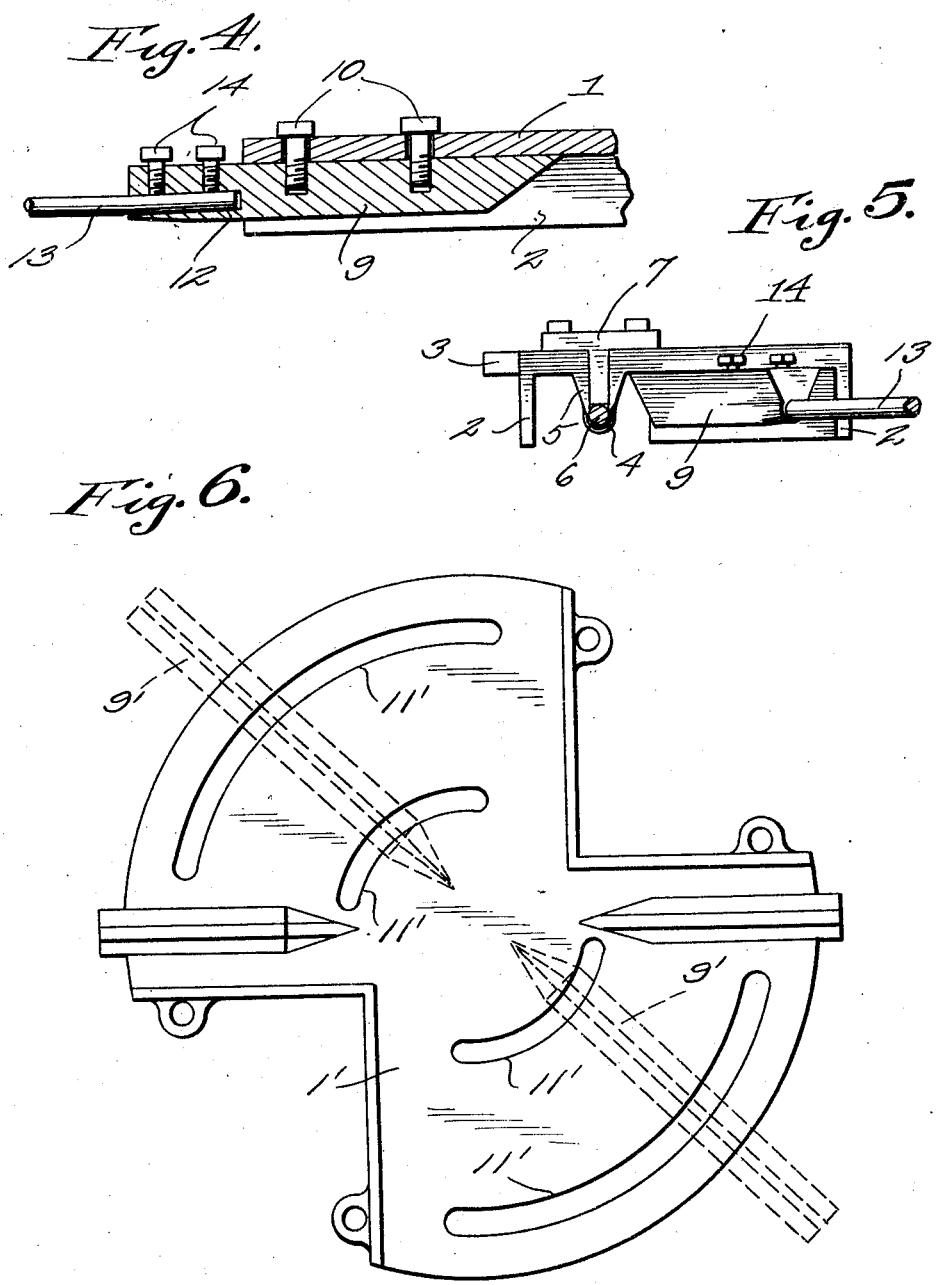

Patented May 7, 1929.

1,711,883

UNITED STATES PATENT OFFICE.

THOMAS BOWERS FORSYTH, OF ELIZABETH, PENNSYLVANIA.

ADJUSTABLE TROLLEY FROG OR SWITCH.

Application filed July 20, 1927. Serial No. 207,283.

This invention relates to a trolley wheel frog or switch, the general object of the invention being to provide the switch with one or more adjustable points so that the switch can be set to secure a crossover of any desired angle.

Another object of the invention is to provide means for clamping or fastening trolley wires to the points.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of one form of switch.

Figure 2 is a section on line 2—2 of Figure 1.

Figure 3 is a top plan view.

Figure 4 is a section on line 4—4 of Figure 3.

Figure 5 is an end view.

Figure 6 is a bottom plan view showing a modification.

In these views 1 indicates a plate which is provided with the depending flanges 2 and with the perforated ears 3, these ears receiving the fastening means which secure the plate to its support. Ribs 4 are formed on the plate at the ends thereof, which provide stationary points of a trolley wheel, the ribs providing grooves 5 for receiving the ends of the wires 6 and these wires are clamped in the grooves by the T-shaped members 7 which are bolted to the top of the plate 1 with their stems entering the grooves and engaging the wires. Each stem is rounded at its lower end for engaging the wire, as clearly shown in Figure 5. The inner ends of the ribs or points are beveled, as shown at 8, so that the trolley wheel can easily pass from one point to the other.

If the device is not placed where a break occurs in the trolley line, then the line can be placed in one of the grooves 5 and carried over the top of the device and passed through the groove formed by the other rib 4, as shown in Figure 3.

The adjustable point 9 is made of the same shape as the rib, but is of solid construction and is of longer length than the stationary points. This rib 9 is connected to the plate by the bolts 10 which pass through arc-shaped slots 11 in the plate so that the point 9 can be adjusted on the plate. The outer end of this point 9 is provided with a socket 12 for receiving the end of the wire 13 and said end is held in the socket by the bolts 14.

The modification shown in Figure 6 is provided with two adjustable points 9', the bolts of which pass through the slots 11' and the plate 1' is of different shape from that shown in the other figures, as this switch is adapted for a crossing where one track crosses another.

From the foregoing it will be seen that with this invention, the trolley wires can be easily and quickly attached to the switch plates and that the wheel can easily pass from the wire upon a point and then pass to another point. It will also be seen that by making one or more of the points adjustable, the adjustable point or points can be set at various angles from the stationary points to suit the crossing with which it is used.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A trolley wheel switch comprising a plate, point forming ribs of hollow construction formed on the under face of the plate, such ribs forming grooves in the top face of the plate, a T-shaped member bolted to the top part of the plate over each rib with its stem extending into the groove for clamping a wire in the groove, said plate having arc-shaped slots therein, an adjustable point forming rib arranged under the slotted portion and bolts passing through the slots and engaging the adjustable rib, the inner ends of the ribs being pointed.

In testimony whereof I affix my signature.

THOMAS BOWERS FORSYTH.